(12) United States Patent
Badey et al.

(10) Patent No.: US 6,486,585 B1
(45) Date of Patent: Nov. 26, 2002

(54) ALTERNATOR WITH INTERPOLAR MAGNETS FOR A MOTOR VEHICLE

(75) Inventors: Jean-Philippe Badey, Etaples sur Mer (FR); Jean-Philippe Frere, Etaples sur Mer (FR); Denis Gravat, La Ferté-Gaucher (FR)

(73) Assignee: Valeo Equipments Electriques Moteur, Creteil (FR)

( * ) Notice: Subject to any disclaimer, the term of this patent is extended or adjusted under 35 U.S.C. 154(b) by 0 days.

(21) Appl. No.: 09/562,310

(22) Filed: May 1, 2000

(30) Foreign Application Priority Data

Apr. 30, 1999 (FR) .............................. 99 05539

(51) Int. Cl.⁷ ............................................. H02K 19/22
(52) U.S. Cl. ................................. 310/263; 310/156.38
(58) Field of Search ................................. 310/263, 156, 310/261, 91, 42

(56) References Cited

U.S. PATENT DOCUMENTS

| | | | | |
|---|---|---|---|---|
| 5,578,885 A | * | 11/1996 | Alford et al. ................ | 310/263 |
| 5,747,913 A | * | 5/1998 | Amlee et al. ................ | 310/263 |
| 5,925,964 A | * | 7/1999 | Kusase et al. .............. | 310/263 |
| 5,973,435 A | * | 10/1999 | Irie et al. .................... | 310/263 |
| 6,013,968 A | * | 1/2000 | Lechner et al. ............. | 310/263 |

FOREIGN PATENT DOCUMENTS

EP          0425132 A        5/1991

OTHER PUBLICATIONS

Patent Abstracts of Japan, vol. 017, No. 371 (E–1396) & JP 05056616 A (Nippondenso Co Ltd).

Patent Abstracts of Japan, vol. 1998, No. 14 & JP 10248221 A (DENso Corp.).

* cited by examiner

Primary Examiner—Tran Nguyen
(74) Attorney, Agent, or Firm—Liniak, Berenato & White

(57) ABSTRACT

The vehicle alternator comprises a rotor (2) having interleaved polar horns (18), at least one of the horns having, facing towards another one of the horns, a side face (20) formed with a profiled groove (22). The groove has one longitudinal end (30) which is blind in a longitudinal direction of the groove.

15 Claims, 3 Drawing Sheets

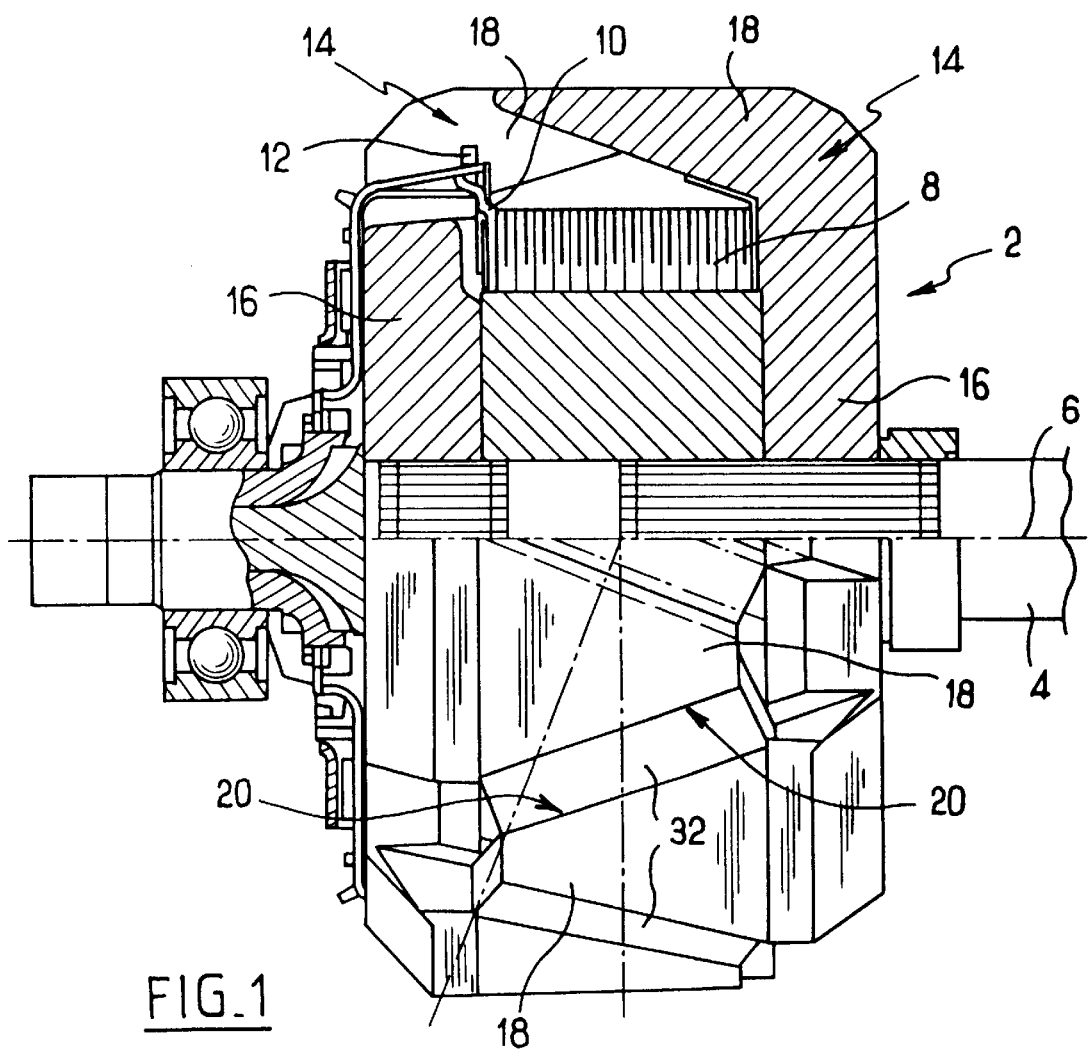
FIG_1
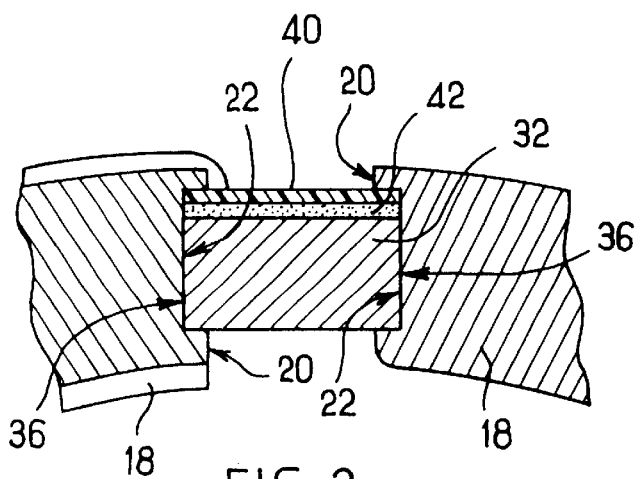
FIG_2
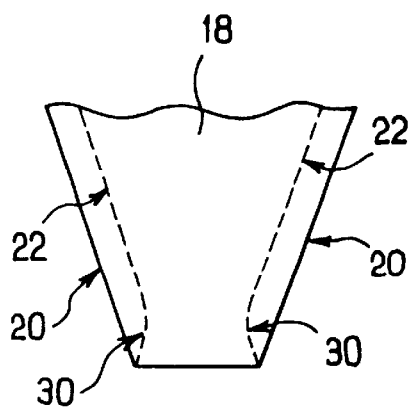
FIG_9

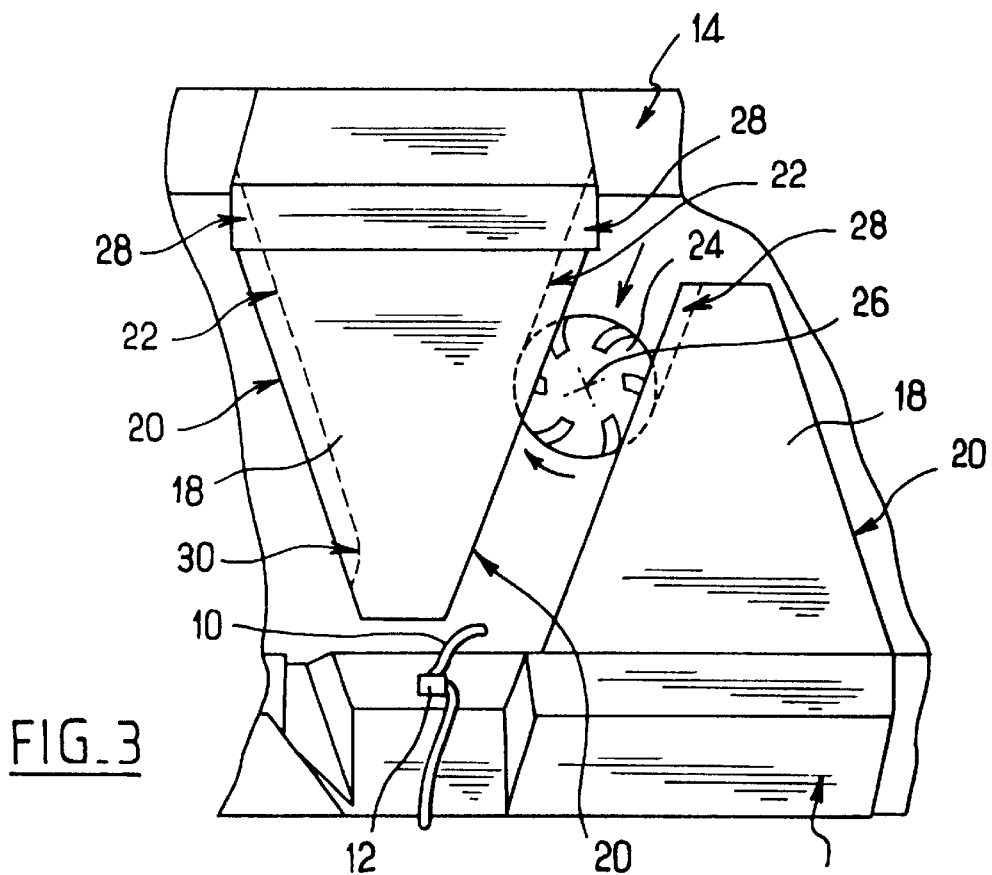
FIG_3
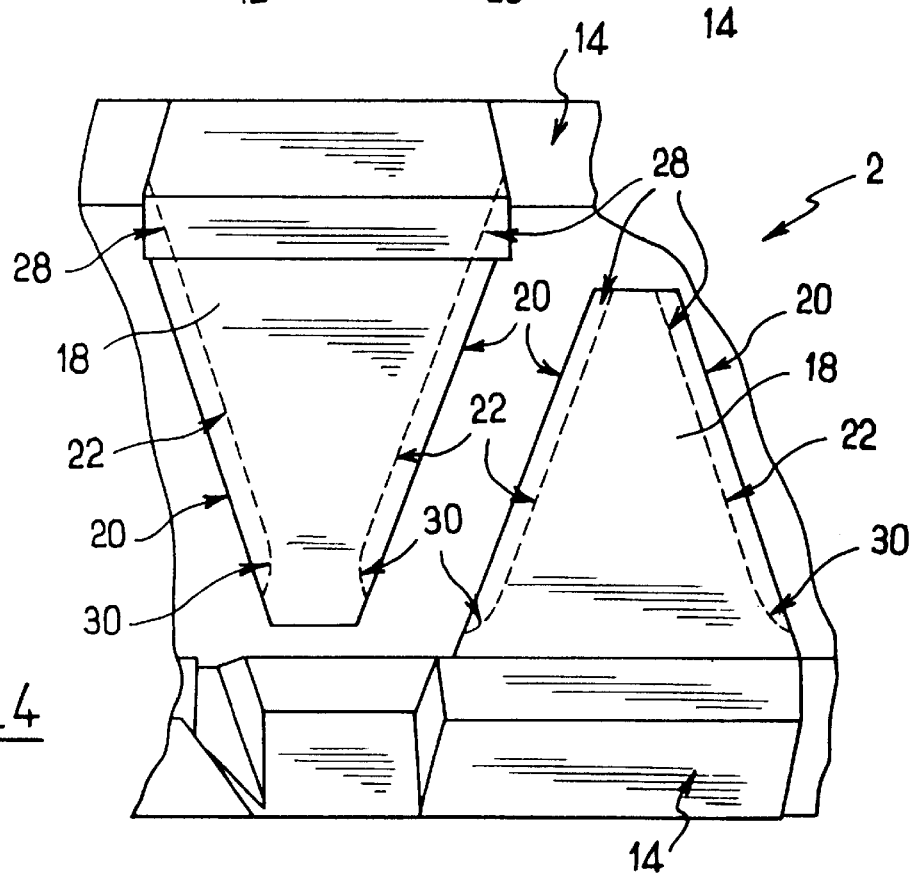
FIG_4

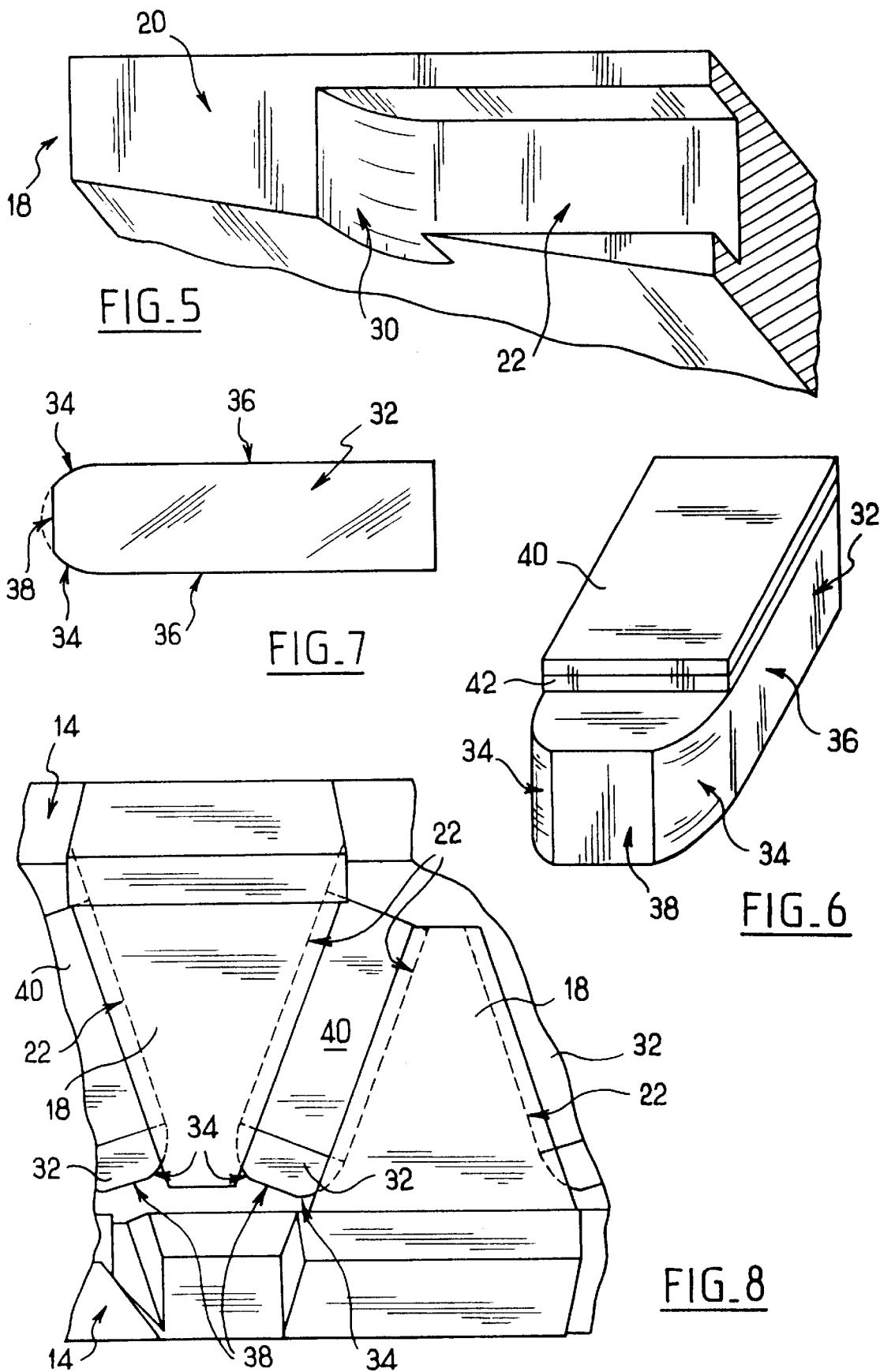

ALTERNATOR WITH INTERPOLAR MAGNETS FOR A MOTOR VEHICLE

BACKGROUND OF THE INVENTION

1. Field of the Invention

This invention relates to alternators and alternator-starters for motor vehicles.

2. Description of Related Art

It is known from the document EP-0 425 132 and the corresponding document U.S. Pat. No. 4,959,577 to provide a motor vehicle alternator having a rotor which includes polar wheels with interleaved horns. Grooves are formed in the side faces of the horns in facing relationship with each other, and magnets are lodged in these grooves to improve the magnetic properties of the rotor. In order to form the grooves, the pole wheels are assembled together, thereby interleaving the horns, and then a milling tool is traversed along each space between the horns, machining the two grooves in facing relationship with each other in a single pass, the milling tool being extracted through the longitudinal end of the groove that was last machined. However, with this method, the horns have to be disposed at a good radial distance away from the heart of the rotor, otherwise there is a danger that the motion of the milling tool will damage parts of the heart of the rotor that project most prominently, such as a length of wire, the capstan member by which the wire is positioned, and so on. However, this results in the rotor and the alternator having a large radial dimension.

SUMMARY OF INVENTION

One object of the invention is to reduce the volume of the alternator, or to preserve its volume when elements are added to it.

With a view to achieving this object, the invention provides a vehicle alternator comprising a rotor having interleaved polar horns, at least one of the horns having, facing another one of the horns, a side face which has a profiled groove, wherein the groove has a longitudinal end which is blind in a longitudinal direction of the groove.

Thus, by locating the blind end close to the portions of the heart of the rotor that project by the greatest radial amount towards the horns (the capstan member, wire, . . . ), it is possible to locate the horns radially closer to the heart so as to reduce the overall diameter of the rotor and the volume of the alternator. Though they are blind, the grooves are able to receive an interpolar magnet. In addition, the blind end provides an abutment which facilitates the longitudinal positioning of the magnet in the grooves, and, usually, its lateral positioning.

Preferably, the two horns have respective grooves facing each other and with blind ends.

Preferably, the blind ends are in facing relationship with each other.

Preferably, the alternator includes a magnet which is received in the grooves between the or each pair of horns.

Preferably, the magnet has at least one face in the form of a sector of a cylinder contiguous with a side face and with an end face of the magnet.

Thus, since the closed end of the groove is itself also in the form of a sector of a cylinder, the longitudinal and lateral positioning of the magnet in the grooves is facilitated, especially as, for the sector of a cylinder of the magnet, the same radius of curvature is chosen as for the sector of a cylinder of the groove. In addition, the magnet thus occupies most of the available space.

Preferably, the magnet has two faces in the form of cylindrical sectors which are contiguous to a common longitudinal end of the magnet.

Thus, this configuration facilitates introduction of the magnet into the grooves.

Preferably, the alternator includes a lamination, which is for example made of a material softer than the material of the magnet, and which extends within the grooves.

The said lamination contributes to the taking up of clearances between the magnet and the grooves.

Also in accordance with the invention, there is provided a method of making a vehicle alternator, comprising a rotor which includes interleaved polar horns, wherein a profiled groove is formed on at least one side face of one of the horns which is adapted to be in facing relationship with another one of the horns, and the groove is formed with a longitudinal end which is blind in a longitudinal direction of the groove.

Preferably, after the horns have been interleaved, two grooves are machined in the side faces of two horns facing each other, both in the same pass of a tool.

Preferably, the grooves are machined starting from an axial end of the grooves which is open in the longitudinal direction, and the tool is then extracted from the grooves through the open end.

BRIEF DESCRIPTION OF DRAWINGS

Further features and advantages of the invention will appear more clearly in the following detailed description of a preferred embodiment which is given by way of non-limiting example. In the attached drawings:

FIG. 1 is a view, partly in elevation and partly in axial cross section, of a rotor of an alternator in accordance with the invention;

FIG. 2 is a view in transverse cross section of one of the interpolar magnets in the alternator of FIG. 1;

FIG. 3 is a partial elevation of the polar horns of the alternator of FIG. 1 during machining of one of the grooves;

FIG. 4 is a view similar to FIG. 3 showing the finished grooves;

FIG. 5 is a partial side view of one of the horns of FIG. 4;

FIG. 6 is a perspective view of an interpolar magnet in the alternator of FIG. 1, with its shim;

FIG. 7 is a plan view of the magnet of FIG. 6 by itself;

FIG. 8 is a view similar to FIG. 4, with the magnets in position; and

FIG. 9 is a partial plan view of one of the horns in another version of the invention.

DETAILED DESCRIPTION OF PREFERRED EMBODIMENTS

In the present embodiment, the alternator or alternator-starter for a motor vehicle comprises a casing and a stator which are conventional and not shown, together with a rotor 2 having a shaft 4 with an axis 6. For more details reference should be made to the document EP-A-0 425 132 mentioned above, which shows a wound stator surrounding a rotor, the stator being carried by a support which includes a front bearing and a rear bearing, each of which carries a rolling bearing for mounting, for rotation therein, the appropriate axial end of the shaft of the stator, with one end of the shaft carrying a drive pulley. In this example, one of the rolling bearings, namely the one associated with the rear bearing, is carried by the shaft 4 in the known way.

In a manner known per se, the rotor includes a winding 8, the wires 10 of which are supported and positioned by capstan members 12 at the level of a length of wire which projects from the winding and which is also connected to a slip ring, not shown, of the alternator. All of the capstan members 12 are adjacent to a common axial end of the shaft. The rotor, of the kind commonly called a claw rotor, has two pole wheels 14, each of which comprises a plate 16 in the form of a disc on the axis 6 together with polar horns 18 which extend axially from one edge of the disc parallel to the axis 6. The general form of the horns 18 is trapezoidal. The two wheels 14 are disposed with their horns 18 pointing towards each other and interleaved in the manner which is known per se. Each horn 18 has two side faces 20 such that the side faces of adjacent horns are facing each other. Each side face has a profiled groove 22, which in this example has a profile with a U-shaped cross section. The capstan members 12 are disposed close to one of the plates, on the left in FIG. 7, in this example the plate which is furthest away from the pulley which is part of the alternator.

The grooves 22 are made in the following way. The shaft 4, the winding 8 of the rotor and the pole wheels 14 are assembled together with the horns interleaved, given that the shaft 4 is locally knurled for fastening the pole wheels 14 and the core (not shown), which is interposed between the wheels and carries the winding 8. Then, for each pair of adjacent horns 18, which are also referred to as teeth, the two grooves 22 on the side faces 20 facing each other, and in this example parallel to each other, are machined at the same time by milling. For this purpose, a milling tool 24 is used which is of the so-called "triple cut" type known per se, that is to say one which is capable of machining both flanks and the bottom of each groove 22 simultaneously. The milling tool 24 is introduced between the base of one of the horns 18 (above the plate 16), and the free end of the other horn, so as to machine a longitudinal end of the grooves which is open on the longitudinal axis of the grooves. More precisely, the milling tool 24 is introduced into the space between the horns 18 from the end of that space which is furthest away from the capstan members 12, that is to say from the right in FIG. 1. The milling tool 24 is then passed between the two horns, with the axis 26 of the tool remaining equidistant from the two side faces 20 of the horns so as to machine the two grooves simultaneously. This pass is interrupted in line with the other end of the space between the horns. The tool 24 is then moved in the opposite direction so that the tool retraces its path, after which it is removed from between the horns 18 through the longitudinal end of the space that was first machined.

This first end thus corresponds to two longitudinal ends 28 of the grooves, which are open on the axis or longitudinal direction of the grooves. On the other hand, the point of reversal of the pass has produced on the grooves 22 a longitudinal end 30 which is not open in the longitudinal direction of the grooves and which is open only sideways. This end 30, which can be clearly seen in FIGS. 4 and 5, is in the form of a sector of a cylinder, due to the cylindrical form of the milling tool 24 and to its rotating movement. The sector is continuous with the bottom of the groove 22. This longitudinal end 30 lies, in this example, spaced away from the pointed end of the horn towards which the first tool pass was directed. Thus, although the horns 18 are very close to the winding 8, machining of the grooves does not interfere with the capstan members 12, which nevertheless lies in an extension of the course of travel of the milling tool beyond the point of reversal. In this way, all of the pairs of grooves 20 are machined successively, starting from the plate 1 6 furthest away from the capstan members 12.

Thanks to the invention, the size of the rotor and therefore of the alternator is able to be reduced. Each groove 24 has, in accordance with the invention, one longitudinal end which is blind in the longitudinal direction. A blind end 30 of a groove 22 is close to the free end of the tooth, while the blind end of the other groove 22, facing a pair of grooves, is close to the appropriate plate.

The alternator includes interpolar magnets 32 which are made of rare earth metals. Each magnet has the general form of a parallelepiped, a rectangle in this example. Two of the edges of the magnet that are adjacent to a common end face 38 are in fact replaced by two sectors 34 of a cylinder having a common axis at right angles to the longitudinal direction of the magnet and parallel to the side faces 36 of the magnet, so that the generatrix of the cylinder sectors 34 is parallel to the side faces 36 and to the end face 38 of the magnet. The diameter of the cylinder sectors 34 is equal to the distance between the two side faces 36. The two cylinder sectors 34 are coaxial. The end face 38, which is reduced because of the sectors 34, is thus in the form of a flat. It is all just as though the magnet were formed with one end in the form of a half cylinder, with the distal zone of the half cylinder truncated so as to produce a flat 38, as illustrated in broken lines in FIG. 7. The flat could however be dispensed with.

Each magnet 32 is mounted in the space between two horns 18, and is received by its side faces 36 in the grooves 22. A lamination or shim 40 overlies the circumferential outer face of the magnet, with a layer of elastic adhesive 42 being interposed. The lamination projects into the grooves 22. However, as is the case here, it may be that it is not in overlying relationship with the rounded axial end of the magnet 32, for which purpose it will have a rectangular form and be shorter than the magnet.

In order to fit the magnet, the lamination 40 is adhesively bonded on the magnet 22, and the whole is then inserted by its rounded end into the space between the horns, at the end of the latter which is furthest away from the capstan members 12, that is to say in the open end 28 of the grooves. The rounded end of the magnet renders this introduction particularly simple to carry out. The magnet then comes into longitudinal abutment against the closed end 30 of the grooves. Here again, this abutment effect facilitates positioning of the magnet: the closed ends ensure longitudinal and lateral positioning of the magnet in the grooves. The lamination 40 ensures that clearances are taken up in the radial direction with respect to the axis 6.

The modified version in FIG. 9 shows the case where the course of travel of the milling tool 24 is longer than in the foregoing embodiment, and it is interrupted just in front of the apex of one of the horns. Here again, it produces in the two grooves 22 closed ends 30 in a longitudinal direction of the groove.

It is of course possible to apply to the invention numerous modifications without departing from the scope of the invention. The grooves 22 may be formed by moulding, although this is less advantageous. Each groove could be machined, separately from the groove that faces it, with a separate pass, for example while the horns are being interleaved, this being done by means of a milling tool having a smaller diameter than in the embodiment described. In this way, cylinder sectors 30 of smaller diameter are generated in the grooves, which enables the portion of the magnet that has a rectangular profile to be extended in length. A sharp edge could be provided between the side face 36 and the sector 34, for example if the magnet has a trapezoidal profile. Magnets without cylindrical sectors could be mounted within the grooves.

Preferably, the magnets are introduced with a fitting clearance or a working clearance between the facing bottoms of the grooves 24 of a pair of horns 18, and the lamination 40 enables the magnets to be held in place.

The alternator may of course be of the reversible type, that is to say it can also be able to transform electrical energy into mechanical energy, thus constituting a starter for the motor vehicle. In that case, the alternator is called an alternator-starter.

Each magnet may of course be provided, in the region of at least one of its side faces, with a lamination of the same type as the lamination 40, to take up circumferential clearances.

Accordingly, the width and diameter of the milling tool may be larger than that of the magnet.

The fitting of the magnet in its associated grooves with a fitting clearance or working clearance enables the stresses in the region of the magnet to be reduced, and therefore enables the dangers of rupture or fracture of the latter, to be reduced.

What is claimed is:

1. A vehicle alternator comprising a rotor (2) having interleaved polar horns (18), at least one of the horns having, facing another one of the horns, a side face (20) having a profiled groove (22), wherein the groove has a longitudinal blind end (30) in the form of a sector of a cylinder which is in a longitudinal direction of the groove.

2. An alternator according to claim 1, wherein the two horns (18) have respective grooves (22) facing each other and with blind ends (30).

3. An alternator according to claim 2, wherein the blind ends (30) are in facing relationship with each other.

4. An alternator according to claim 2, wherein the alternator includes a magnet (32) which is received in the grooves (22) between the pair of horns (18).

5. An alternator according to claim 4, wherein the magnet (32) has at least one face (34) in the form of a sector of a cylinder contiguous with a side face (36) and with an end face (38) of the magnet.

6. An alternator according to claim 4, wherein the magnet (32) has two faces (34) in the form of cylindrical sectors which are contiguous to a common longitudinal end (38) of the magnet.

7. An alternator according to claim 4, wherein the alternator includes a lamination (40), overlying a circumferential outer face of the magnet and the lamination extending within the grooves (22).

8. A method of making a vehicle alternator, comprising a rotor (2) which includes interleaved polar horns (18), wherein a profiled groove (22) is formed on at least one side face (20) of one of the horns which is adapted to be in facing relationship with another one of the horns, wherein the groove (22) is formed with a longitudinal end (30) which is blind in a longitudinal direction of the groove.

9. A method according to claim 8, wherein, after the horns (18) have been interleaved, two grooves (22) are machined in the side faces (20) of two horns (18) facing each other, both in the same pass of a tool (24).

10. A method according to claim 9, wherein the grooves (22) are machined starting from an axial end (28) of the grooves which is open in the longitudinal direction, and the tool (24) is then extracted from the grooves (22) through the open end (28).

11. The alternator according to claim 7, wherein the lamination is adhesively bonded to the magnet.

12. The alternator according to claim 7, wherein the lamination is made of a material softer than a material of the magnet.

13. A vehicle alternator comprising:

a rotor having a plurality of interleaved polar horns extending between opposite ends thereof, at least one pair of adjacent interleaved polar horns each having a side face with a profiled groove facing each other, each of said profiled grooves terminating at a blind end located between and spaced apart from said ends of said polar horns.

14. The alternator according to claim 13, wherein said blind end being in a form of a sector of a cylinder terminating a longitudinal direction of the groove.

15. The alternator according to claim 14, further comprising:

a magnet received in and disposed between said profile grooves, said magnet having at least one face in the form or a second sector of a cylinder abutting and corresponding to said blind ends of said profile grooves.

* * * * *